(12) United States Patent
Tsai et al.

(10) Patent No.: US 10,487,184 B2
(45) Date of Patent: Nov. 26, 2019

(54) CONTINUOUS PROCESS FOR PREPARING A POLYESTER SHRINKABLE FILM

(71) Applicant: Far Eastern New Century Corporation, Taipei (TW)

(72) Inventors: Ching-Chun Tsai, Taipei (TW); Tsung-Hung Liu, Taipei (TW); Tsan-Chin Chang, Taipei (TW); Chi-Feng Lin, Taipei (TW); Jie Shiu, Taipei (TW); Chien-Wei Wang, Taipei (TW); Chin-Tien Chen, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 301 days.

(21) Appl. No.: 15/724,872

(22) Filed: Oct. 4, 2017

(65) Prior Publication Data

US 2018/0346671 A1    Dec. 6, 2018

(30) Foreign Application Priority Data

Jun. 6, 2017 (TW) .............................. 106118667 A

(51) Int. Cl.
| | |
|---|---|
| *C08J 5/18* | (2006.01) |
| *B29C 48/00* | (2019.01) |
| *C08G 63/88* | (2006.01) |
| *B29C 55/12* | (2006.01) |
| *B29K 67/00* | (2006.01) |
| *B29C 48/08* | (2019.01) |
| *C08G 63/89* | (2006.01) |

(52) U.S. Cl.
CPC ............. *C08J 5/18* (2013.01); *B29C 48/0018* (2019.02); *C08G 63/88* (2013.01); *B29C 48/08* (2019.02);
(Continued)

(58) Field of Classification Search
CPC ...... C08J 5/18; C08J 2367/02; B29C 48/0018; B29C 48/08; B29C 55/12; B29C 48/305;
(Continued)

(56) References Cited

U.S. PATENT DOCUMENTS

| | | | | |
|---|---|---|---|---|
| 4,898,897 A | * | 2/1990 | Kiyohara | ............... C08G 63/88 523/343 |
| 5,968,429 A | * | 10/1999 | Treece | ................ B29B 17/0005 264/102 |

(Continued)

FOREIGN PATENT DOCUMENTS

TW        2008/19482 A        5/2008

OTHER PUBLICATIONS

Search Report appended to an Office Action issued to Taiwanese counterpart application No. 106118667 by the TIPO dated Jan. 17, 2018.

*Primary Examiner* — Jeffrey M Wollschlager
(74) *Attorney, Agent, or Firm* — Cesari and McKenna LLP

(57) ABSTRACT

A continuous process for preparing a polyester shrinkable film includes: pumping an amorphous PET-based polyester melt having a melt viscosity $\eta 1$ directly from a polymerization reactor into a first cooling zone; cooling the polyester melt to increase the melt viscosity thereof to a melt viscosity $\eta 2$ such that a difference between $\eta 2$ and $\eta 1$ ranges from 1500 poise to 3500 poise; feeding the polyester melt into a second cooling zone; cooling the polyester melt to increase the melt viscosity thereof to a melt viscosity $\eta 3$ ranging from 5000 poise to 12000 poise such that a difference between $\eta 3$ and $\eta 2$ ranges from 1000 poise to 5500 poise; and pumping the polyester melt from the second cooling zone into a zone for film-forming treatment.

11 Claims, 7 Drawing Sheets

(52) U.S. Cl.
CPC ........ *B29C 55/12* (2013.01); *B29K 2067/003* (2013.01); *B29K 2995/0039* (2013.01); *C08G 63/89* (2013.01); *C08J 2367/02* (2013.01)

(58) Field of Classification Search
CPC ...... B29K 2995/0039; B29K 2067/003; C08G 63/88; C08G 63/89
See application file for complete search history.

(56) References Cited

U.S. PATENT DOCUMENTS

| | | | | |
|---|---|---|---|---|
| 7,547,406 | B2 * | 6/2009 | Otto | B29B 7/325 264/297.1 |
| 8,293,162 | B2 * | 10/2012 | Yokoyama | C08G 63/785 264/297.2 |
| 8,545,205 | B2 * | 10/2013 | Barakat | B32B 37/15 425/145 |
| 9,011,737 | B2 * | 4/2015 | Barakat | B29C 48/285 264/40.7 |
| 2003/0165658 | A1 * | 9/2003 | Hayakawa | B29C 61/003 428/98 |
| 2004/0191493 | A1 * | 9/2004 | Hayakawa | B29C 55/06 428/220 |
| 2007/0104931 | A1 * | 5/2007 | Ito | B29C 61/003 428/220 |
| 2008/0260979 | A1 * | 10/2008 | Yokoyama | B29C 31/04 428/35.7 |
| 2009/0093600 | A1 * | 4/2009 | Moore | B01J 19/18 526/65 |

* cited by examiner

CONTINUOUS PROCESS FOR PREPARING A POLYESTER SHRINKABLE FILM

CROSS-REFERENCE TO RELATED APPLICATION

This application claims priority of Taiwanese Application No. 106118667, filed on Jun. 6, 2017.

FIELD

The disclosure relates to a continuous process for preparing a polyester shrinkable film, and more particularly to a continuous process for preparing a polyester shrinkable film from an amorphous PET-based polyester melt.

BACKGROUND

A conventional process for preparing a polyester shrinkable film is batchwise and, as shown in FIG. 1, includes steps of: (i) subjecting a stock mixture containing a diacid component and a diol component to esterification at an elevated temperature in an esterification reactor 1 to obtain a reaction mixture; (ii) subjecting the reaction mixture to polymerization at an elevated temperature in a polymerization reactor 2 to obtain a polyester melt; (iii) subjecting the polyester melt to cooling and then pelletizing in a pelletizer 3 to obtain polyester pellets, and storing the polyester pellets in a storage tank 4; (iv) subjecting the polyester pellets to drying and introducing the dried polyester pellets into an extruder 5 to form a polyester melt by heating; and (v) introducing the polyester melt into a T-die 6, a casting device 7, and a stretching device 8 in sequence to prepare the polyester shrinkable film.

In step (iv) of the batchwise process, the polyester pellets should be reheated at a temperature usually from 230° C. to 250° C. in the extruder 5 to form the polyester melt. Such a step may result in thermal cracking of the polyester melt, leading to a reduction in the intrinsic viscosity of the polyester melt, which may affect mechanical properties of the polyester shrinkable film. In order not to affect the mechanical properties of the polyester shrinkable film, the intrinsic viscosity of the polyester melt should be raised to a value, for example, above 0.7 in the aforesaid step (ii). However, in order to obtain a higher intrinsic viscosity for the polyester melt, it is necessary to raise a reaction temperature and/or extend a reaction period in step (ii), which may result in deterioration of hue of the polyester shrinkable film thus prepared. In addition to the aforesaid shortcoming, the batchwise process involves the processing steps of cooling, pelletizing, transporting, storing, drying, etc. Some of these processing steps are performed in an open environment, which may cause a problem of contamination by extraneous substances. Furthermore, it is required that the polyester pellets be reheated for hot melt extrusion through the extruder 5 prior to a subsequent film-forming treatment. In addition, there is a difference in residence time between an initial pelletization stage and a subsequent pelletization stage, leading to a variation in viscosity of the polyester, which may affect the stability of the subsequent film-forming treatment. Moreover, since the batchwise process involves the aforesaid various processing steps, it is costly.

In view of the various problems mentioned above, it is desirable to modify the batchwise process to a continuous process. In this case, it is primarily desirable to eliminate steps (iii) and (iv) of the batchwise process so as to avoid the shortcoming associated with the reheating of the polyester pellets. In other words, it is desirable to directly introduce the polyester melt in step (ii) into the T-die 6. However, since the polyester melt in step (ii) usually has a relatively low melt viscosity, it cannot be directly introduced into the T-die 6 without raising the melt viscosity thereof.

CN 103059523 discloses an in-situ polymerization tape-casting method for preparing a biaxial stretching polyester film. The polyester used in the method is of high crystallinity so as to maintain a high melt viscosity sufficient for the subsequent film-forming treatment at an elevated temperature (for example, 265° C.). However, since the polyester is of high crystallinity, the polyester may crystallize when the temperature of the T-die is lower than a melting point of the polyester. The polyester crystals thus formed may adhere to the T-die such that the polyester prepared accordingly has increased flow marks.

Low-crystalline or amorphous polyester may not be used in the method disclosed in CN 103059523 due to insufficient crystallinity thereof. In the preparation of a stretchable film of low-crystalline or amorphous polyester, the melt viscosity of the polyester is usually increased by raising the reaction temperature and/or extending the reaction period in the polymerization step so as to provide the polyester with a sufficiently high melt viscosity in the T-die. However, as described above, raising the reaction temperature and/or extending the reaction period may result in deterioration of hue of the shrinkable film thus prepared.

SUMMARY

An object of the disclosure is to provide a continuous process for preparing a polyester shrinkable film of an amorphous PET-based polyester melt without extending the reaction period in the polymerization step.

According to the disclosure, there is provided a continuous process for preparing a polyester shrinkable film, comprising:

(a) pumping an amorphous PET-based polyester melt having a melt viscosity $\eta1$ directly from a polymerization reactor into a first cooling zone in such a manner that a flow rate of the amorphous PET-based polyester melt at an entry of the first cooling zone is substantially the same as the flow rate of the amorphous PET-based polyester melt at an exit of the first cooling zone;

(b) cooling the amorphous PET-based polyester melt in the first cooling zone to increase the melt viscosity of the amorphous PET-based polyester melt to a melt viscosity $\eta2$ such that a melt viscosity difference between $\eta2$ and $\eta1$ ranges from 1500 poise to 3500 poise;

(c) feeding immediately after (b) the amorphous PET-based polyester melt from the first cooling zone into a second cooling zone in such a manner that the flow rate of the amorphous PET-based polyester melt at an entry of the second cooling zone is substantially the same as the flow rate of the amorphous PET-based polyester melt at an exit of the second cooling zone;

(d) cooling the amorphous PET-based polyester melt in the second cooling zone to increase the melt viscosity of the amorphous PET-based polyester melt to a melt viscosity $\eta3$ ranging from 5000 poise to 12000 poise such that a melt viscosity difference between $\eta3$ and $\eta2$ ranges from 1000 poise to 5500 poise; and (e) pumping the amorphous PET-based polyester melt from the second cooling zone into a zone for film-forming treatment.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
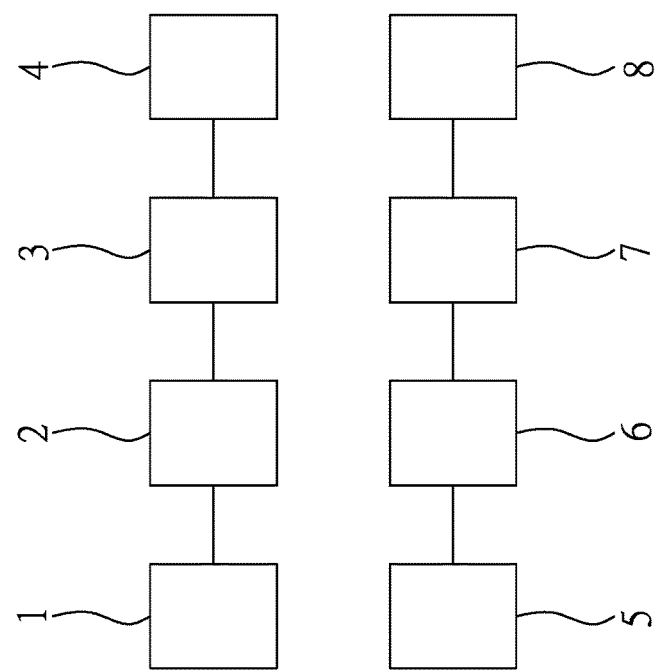
FIG. 1 is a schematic block diagram of a preparation system for a conventional batchwise process for preparing a polyester shrinkable film.

A continuous process for preparing a polyester shrinkable film according to the present disclosure comprises:

(a) pumping an amorphous PET-based polyester melt having a melt viscosity $\eta 1$ directly from a polymerization reactor into a first cooling zone in such a manner that a flow rate of the amorphous PET-based polyester melt at an entry of the first cooling zone is substantially the same as the flow rate of the amorphous PET-based polyester melt at an exit of the first cooling zone;

(b) cooling the amorphous PET-based polyester melt in the first cooling zone to increase the melt viscosity of the amorphous PET-based polyester melt to a melt viscosity $\eta 2$ such that a melt viscosity difference between $\eta 2$ and $\eta 1$ ranges from 1500 poise to 3500 poise;

(c) feeding immediately after (b) the amorphous PET-based polyester melt from the first cooling zone into a second cooling zone in such a manner that the flow rate of the amorphous PET-based polyester melt at an entry of the second cooling zone is substantially the same as the flow rate of the amorphous PET-based polyester melt at an exit of the second cooling zone;

(d) cooling the amorphous PET-based polyester melt in the second cooling zone to increase the melt viscosity of the amorphous PET-based polyester melt to a melt viscosity $\eta 3$ ranging from 5000 poise to 12000 poise such that a melt viscosity difference between $\eta 3$ and $\eta 2$ ranges from 1000 poise to 5500 poise; and (e) pumping the amorphous PET-based polyester melt from the second cooling zone into a zone for film-forming treatment.

In certain embodiments, the melt viscosity difference between $\eta 2$ and $\eta 1$ ranges from 1700 poise to 3400 poise, and the melt viscosity difference between $\eta 3$ and $\eta 2$ ranges from 1100 poise to 5300 poise. These melt viscosity differences can be controlled within the aforesaid ranges by, for example, controlling the temperatures and/or the pressures at the entries and exits of the first and second cooling zones.

In certain embodiments, the melt viscosity $\eta 3$ ranges from 5000 poise to 11000 poise.

In certain embodiments, the amorphous PET-based polyester melt has a pressure P1 at the entry of the first cooling zone, a pressure P2 at the entry of the second cooling zone, and a pressure P3 at the exit of the second cooling zone. P1 is larger than P2, P2 is larger than P3, a pressure difference between P1 and P2 is not larger than 15 bar, and a pressure difference between P2 and P3 is not larger than 15 bar. When the pressure difference between P1 and P2 is larger than 15 bar or the pressure difference between P2 and P3 is larger than 15 bar, a heat-exchanging tube in the first and/or second cooling zone is liable to bend or even be damaged. In certain embodiments, the pressure P3 ranges from 15 bar to 85 bar, the pressure difference between P1 and P2 is not larger than 15 bar, and the pressure difference between P2 and P3 is not larger than 15 bar.

In certain embodiments, in (a), the amorphous PET-based polyester melt has a temperature T1, and in (b) the amorphous PET-based polyester melt is cooled to a temperature T2 such that a temperature difference between T2 and T1 ranges from 10° C. to 30° C. In (d), the amorphous PET-based polyester melt is cooled to a temperature T3 such that a temperature difference between T3 and T2 ranges from 10° C. to 30° C. When the temperature difference between T2 and T1 and/or the temperature difference between T3 and T2 is larger than 30° C., the melt viscosity of the polyester melt may increase abruptly, which may result in bending or damaging of the heat-exchanging tube in the first and/or second cooling zone or which may affect moldability of the polyester shrinkable film. On the other hand, When the temperature difference between T2 and T1 and/or the temperature difference between T3 and T2 is smaller than 10° C., the melt viscosity $\eta 3$ of the polyester melt may not be controlled within the range from 5000 poise to 11000 poise and the moldability of the polyester shrinkable film may be affected accordingly. In certain embodiments, the temperature T3 ranges from 220° C. to 265° C.

In certain embodiments, P1 is larger than P2, P2 is larger than P3, the pressure difference between P1 and P2 is not larger than 15 bar, and the pressure difference between P2 and P3 is not larger than 15 bar. Additionally, the temperature difference between T2 and T1 ranges from 10° C. to 30° C. and the temperature difference between T3 and T2 ranges from 10° C. to 30° C.

In certain embodiments, each of the first and second cooling zones includes at least one sub-cooling zone. The number of the sub-cooling zone in each of the first and second cooling zones also indicates the number of cooling performed in each of the first and second cooling zones. For example, when the first cooling zone includes two sub-cooling zones, the polyester melt is cooled in the two sub-cooling zones in the first cooling zone in sequence, that is, the polyester melt is cooled in the first cooling zone twice.

In certain embodiments, the amorphous PET-based polyester melt is obtained by subjecting to polymerization a composition which includes a dicarboxylic acid component, a diol component, and a copolymerizable component that provides the amorphous PET-based polyester melt with an improved amorphous property and that is other than the dicarboxylic acid component and the diol component.

The dicarboxylic acid component may include any one or more of diacid compounds suitable for preparing a polyester stretchable film. Examples of the dicarboxylic acid component include, but are not limited to, terephthalic acid, 1,4-cyclohexane dicarboxylic acid, 1,3-cyclohexane dicarboxylic acid, butanedioic acid, hexanedioic acid, decanedioic acid, and combinations thereof. These dicarboxylic acid compounds may be used alone or in admixture of two or more. In the illustrative examples below, terephthalic acid is used as the dicarboxylic acid component.

The diol component may include any one or more of diol compounds suitable for preparing a polyester stretchable film. Examples of the diol component include, but are not limited to, ethylene glycol, 2-[2-(2-hydroxyethoxy)ethoxy]ethanol, propylene glycol, 1,4-butanediol, 1,2-pentanediol, hexanediol, neopentyl glycol, 1,4-cyclohexane-dimethanol, 1,2-cyclohexane-dimethanol, 1,3-cyclohexane-dimethanol, tetramethyl cyclobutanediol, isosorbide, and combinations thereof. These diol compounds may be used alone or in admixture of two or more. In the illustrative examples, ethylene glycol is used as the diol component.

The copolymerizable component may include any one or more of dicarboxylic acid compounds or diol compounds which are suitable for modifying polyester. Examples of the copolymerizable component include, but are not limited to, isophthalic acid, neopentyl glycol, 1,4-cyclohexanedimethanol, 2-methyl-1,3-propylene glycol, diethylated 2-methyl-1,3-propylene glycol, and combinations thereof. These compounds may be used alone or in admixture of two or more. In the illustrative examples, neopentyl glycol is used as the copolymerizable component.

The amount of the copolymerizable component used in the composition may be adjusted according to specific requirements, such as practical operation conditions of the continuous process of the disclosure or desired properties of the polyester shrinkable film to be prepared. In certain embodiments, the copolymerizable component is isophthalic acid, and is used in an amount ranging from 10 to 35 moles based on 100 moles of the dicarboxylic acid component. In certain embodiments, the copolymerizable component is selected from the group consisting of neopentyl glycol, 1,4-cyclohexanedimethanol, 2-methyl-1,3-propylene glycol, diethylated 2-methyl-1,3-propylene glycol, and combinations thereof, and is used in an amount ranging from 10 to 25 moles based on 100 moles of the diol component.

Any additive agents commonly used in the art of polyester shrinkable films may be included in the composition for obtaining the amorphous PET-based polyester melt. Examples of the additive agents include, but are not limited to, catalysts, stabilizers, antioxidants, antistatic agents, antifoaming agents, dyeing auxiliaries, dyes, colorants, delusterants, and optical brightening agents. Examples of the catalysts include, but are not limited to, antimony oxide, titanium catalyst, germanium catalyst, tin catalyst, gallium catalyst, aluminum catalyst, and combinations thereof. Examples of the stabilizers include, but are not limited to, phosphoric acid, trimethyl phosphate, triethyl phosphate, triethyl phosphonoacetate, tripropyl phosphate, and combinations thereof.

In certain embodiments, an intrinsic viscosity of the amorphous PET-based polyester melt suitable for processing by the continuous process of the disclosure is larger than 0.58. It is not required for the continuous process of the disclosure to raise the intrinsic viscosity of the amorphous PET-based polyester melt to that (i.e., 0.7) required in the prior art.

In certain embodiments, the film-forming treatment includes casting and biaxial stretching. The casting may be performed using a casting machine. The biaxial stretching may be performed using a uniaxial stretching machine or a biaxial stretching machine.

Examples of the disclosure will be described hereinafter. It is to be understood that these examples are exemplary and explanatory and should not be construed as a limitation to the disclosure.

Before the examples are described in greater detail, it should be noted that where considered appropriate, reference numerals or terminal portions of reference numerals have been repeated among the figures to indicate corresponding or analogous elements, which may optionally have similar characteristics.

Example 1

Figure 2:
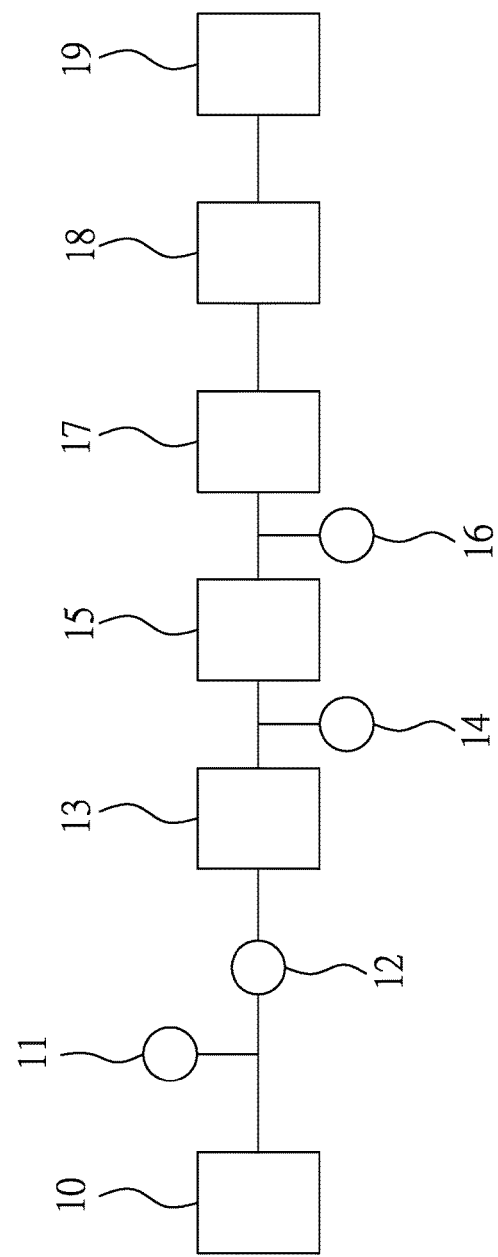
FIG. 2 is a schematic block diagram of a preparation system for Example 1 of a continuous process for preparing a polyester shrinkable film according to the disclosure.

Referring to FIG. 2, 100 mole % of terephthalic acid, 80 mole % of ethylene glycol, 20 mole % of neopentyl glycol, and 300 ppm of antimony trioxide catalyst were introduced into a polymerization reactor 10, in which an esterification reaction was conducted at a temperature of 267° C. under a pressure of 80-90 mPa for 4 hours, followed by a polymerization reaction at a temperature of 286° C. under a pressure of 2-3 mPa for 4 hours to obtain an amorphous PET-based polyester melt.

A melt viscosity $\eta 1$ of the amorphous PET-based polyester melt was measured using a first viscometer 11 disposed downstream the polymerization reactor 10 and upstream a first cooler 13. The amorphous PET-based polyester melt having the melt viscosity $\eta 1$ was pumped directly from the polymerization reactor 10 into the first cooler 13 via a pump 12 in such a manner that a flow rate of the amorphous PET-based polyester melt at the entry of the first cooler 13 was substantially the same as the flow rate of the amorphous PET-based polyester melt at the exit of the first cooler 13.

The amorphous PET-based polyester melt was cooled in the first cooler 13 to increase the melt viscosity of the amorphous PET-based polyester melt to a melt viscosity $\eta 2$ while the melt viscosity $\eta 2$ was measured continuously using a second viscometer 14 disposed downstream the first cooler 13 and upstream a second cooler 15 such that a melt viscosity difference between $\eta 2$ and $\eta 1$ ranged from 1500 poise to 3500 poise.

The amorphous PET-based polyester melt was fed immediately from the first cooler 13 into the second cooler 15 in such a manner that the flow rate of the amorphous PET-based polyester melt at the entry of the second cooler 15 was substantially the same as the flow rate of the amorphous PET-based polyester melt at the exit of the second cooler 15.

The amorphous PET-based polyester melt was cooled in the second cooler 15 to increase the melt viscosity of the amorphous PET-based polyester melt to a melt viscosity $\eta 3$ while the melt viscosity $\eta 3$ was measured continuously using a third viscometer 16 disposed downstream the second cooler 15 and upstream a T-die 17 such that melt viscosity $\eta 3$ was in a range from 5000 poise to 12000 poise and that a melt viscosity difference between $\eta 3$ and $\eta 2$ ranged from 1000 poise to 5500 poise.

The amorphous PET-based polyester melt was pumped from the second cooler 15 into the T-die 17 for extrusion while variation of a sheet width of an extruded sheet from the T-die 17 was observed. The variation of the sheet width of the extruded sheet was recorded and used to evaluate moldability of the amorphous PET-based polyester melt. The result of the moldability is shown in Table 1. In addition, the film-forming capability of the extruded sheet from the T-die was observed and evaluated according to the following standards, and is shown in Table 1. The extruded sheet from the T-die 17 was then transported through a casting machine 18 and a stretching machine 19 in sequence to obtain a polyester stretchable film.

Film-Forming Capability:

◯: The extruded sheet from the T-die was extruded smoothly and formed into a film.

X: The extruded sheet from the T-die had an undesirably high viscosity such that it could not be extruded smoothly or had an undesirably low viscosity such that it could not be formed into a film.

Moldability Measurement:

Variation of a sheet width of an extruded sheet from the T-die 17 was observed to determine whether a necking phenomenon occurred in the extruded sheet. The following standards were used to evaluate the variation of the sheet width of the extruded sheet:

◯: Variation of sheet width<15%

Δ: 15%≤Variation of sheet width≤20%

X: Variation of sheet width>25%

Example 2

Figure 3:
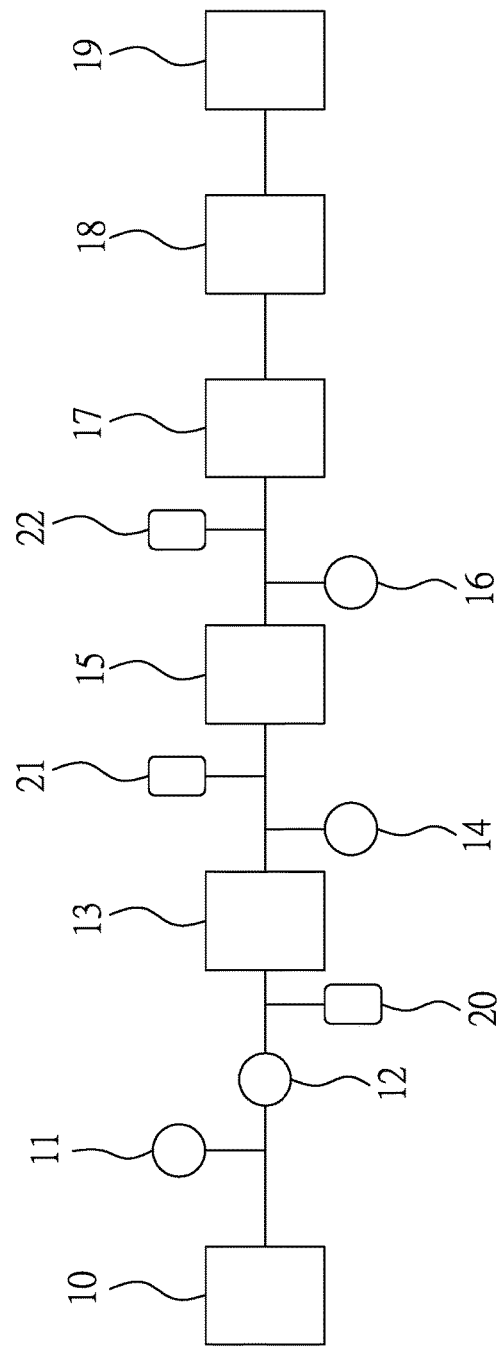
FIG. 3 is a schematic block diagram of a preparation system for Example 2 of a continuous process for preparing a polyester shrinkable film according to the disclosure.

Referring to FIG. 3, 100 mole % of terephthalic acid, 80 mole % of ethylene glycol, 20 mole % of neopentyl glycol, and 300 ppm of antimony trioxide catalyst were introduced into a polymerization reactor 10, in which an esterification reaction was conducted at a temperature of 267° C. under a pressure of 80-90 mPa for 4 hours, followed by a polymerization reaction at a temperature of 286° C. under a pressure of 2-3 mPa for 4 hours to obtain an amorphous PET-based polyester melt.

A melt viscosity $\eta 1$ of the amorphous PET-based polyester melt was measured using a first viscometer 11 disposed downstream the polymerization reactor 10 and upstream a first cooler 13. A pressure P1 of the amorphous PET-based polyester melt at the entry of the first cooler 13 was measured using a first pressure meter 20 disposed downstream the polymerization reactor 10 and upstream the first cooler 13. The amorphous PET-based polyester melt having the melt viscosity $\eta 1$ was pumped directly from the polymerization reactor 10 into the first cooler 13 via a pump 12 in such a manner that a flow rate of the amorphous PET-based polyester melt at the entry of the first cooler 13 was substantially the same as the flow rate of the amorphous PET-based polyester melt at the exit of the first cooler 13.

The amorphous PET-based polyester melt was cooled in the first cooler 13 to increase the melt viscosity of the amorphous PET-based polyester melt to a melt viscosity $\eta 2$ while the melt viscosity $\eta 2$ was measured continuously using a second viscometer 14 disposed downstream the first cooler 13 and upstream a second cooler 15 such that a melt viscosity difference between $\eta 2$ and $\eta 1$ ranged from 1500 poise to 3500 poise.

A pressure P2 of the amorphous PET-based polyester melt at the entry of the second cooler 15 was measured using a second pressure meter 21 disposed downstream the first cooler 13 and upstream the second cooler 15 and was controlled such that a pressure difference between P1 and P2 was not larger than 15 bar. The amorphous PET-based polyester melt was fed immediately from the first cooler 13 into the second cooler 15 in such a manner that the flow rate of the amorphous PET-based polyester melt at the entry of the second cooler 15 was substantially the same as the flow rate of the amorphous PET-based polyester melt at the exit of the second cooler 15.

The amorphous PET-based polyester melt was cooled in the second cooler 15 to increase the melt viscosity of the amorphous PET-based polyester melt to a melt viscosity $\eta 3$ while the melt viscosity $\eta 3$ was measured continuously using a third viscometer 16 disposed downstream the second cooler 15 and upstream a T-die 17 such that the melt viscosity $\eta 3$ was in a range from 5000 poise to 12000 poise and that a melt viscosity difference between $\eta 3$ and $\eta 2$ ranged from 1000 poise to 5500 poise.

A pressure P3 of the amorphous PET-based polyester melt at the exit of the second cooler 15 was measured using a third pressure meter 22 disposed downstream the second cooler 15 and upstream the T-die 17 and was controlled such that a pressure difference between P2 and P3 was not larger than 15 bar. The amorphous PET-based polyester melt was pumped from the second cooler 15 into the T-die 17 for extrusion while variation of a sheet width of an extruded sheet from the T-die 17 was observed. The variation of the sheet width of the extruded sheet was evaluated by the moldability measurement described in Example 1 and is shown in Table 1. In addition, the film-forming capability of the extruded sheet from the T-die was evaluated according to the standards described in Example 1, and is shown in Table 1. The extruded sheet from the T-die 17 was transported through a casting machine 18 and a stretching machine 19 in sequence to obtain a polyester stretchable film.

Example 3

Figure 4:
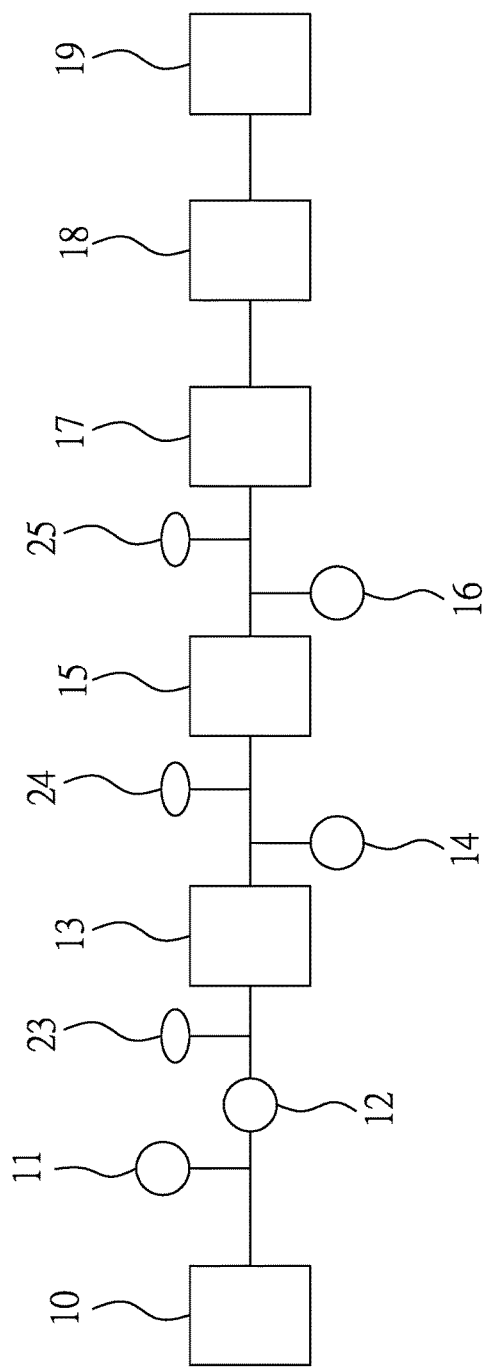
FIG. 4 is a schematic block diagram of a preparation system for Example 3 of a continuous process for preparing a polyester shrinkable film according to the disclosure.

Referring to FIG. 4, 100 mole % of terephthalic acid, 80 mole % of ethylene glycol, 20 mole % of neopentyl glycol, and 300 ppm of antimony trioxide catalyst were introduced into a polymerization reactor 10, in which an esterification reaction was conducted at a temperature of 267° C. under a pressure of 80-90 mPa for 4 hours, followed by a polymerization reaction at a temperature of 286° C. under a pressure of 2-3 mPa for 4 hours to obtain an amorphous PET-based polyester melt.

A melt viscosity $\eta 1$ of the amorphous PET-based polyester melt was measured using a first viscometer 11 disposed downstream the polymerization reactor 10 and upstream a first cooler 13. A temperature T1 of the amorphous PET-based polyester melt at the entry of the first cooler 13 was measured using a first thermometer 23 disposed downstream the polymerization reactor 10 and upstream the first cooler 13. The amorphous PET-based polyester melt having the melt viscosity $\eta 1$ was pumped directly from the polymerization reactor 10 into the first cooler 13 via a pump 12 in such a manner that a flow rate of the amorphous PET-based polyester melt at the entry of the first cooler 13 was substantially the same as the flow rate of the amorphous PET-based polyester melt at the exit of the first cooler 13.

The amorphous PET-based polyester melt was cooled in the first cooler 13 to increase the melt viscosity of the amorphous PET-based polyester melt to a melt viscosity $\eta 2$ while the melt viscosity $\eta 2$ was measured continuously using a second viscometer 14 disposed downstream the first cooler 13 and upstream a second cooler 15 such that a melt viscosity difference between $\eta 2$ and $\eta 1$ ranged from 1500 poise to 3500 poise. A temperature T2 of the amorphous PET-based polyester melt at the exit of the first cooler 12 was measured using a second thermometer 24 disposed downstream the first cooler 13 and upstream the second cooler 15 and was controlled such that a temperature difference between T1 and T2 ranged from 10° C. to 30° C.

The amorphous PET-based polyester melt was fed immediately from the first cooler 13 into the second cooler 15 in such a manner that the flow rate of the amorphous PET-based polyester melt at the entry of the second cooler 15 was substantially the same as the flow rate of the amorphous PET-based polyester melt at the exit of the second cooler 15.

The amorphous PET-based polyester melt was cooled in the second cooler 15 to increase the melt viscosity of the amorphous PET-based polyester melt to a melt viscosity $\eta 3$ while the melt viscosity $\eta 3$ was measured continuously using a third viscometer 16 disposed downstream the second cooler 15 and upstream a T-die 17 such that the melt viscosity $\eta 3$ was in a range from 5000 poise to 12000 poise and that a melt viscosity difference between $\eta 3$ and $\eta 2$ ranged from 1000 poise to 5500 poise. A temperature T3 of the amorphous PET-based polyester melt at the exit of the second cooler 15 was measured using a third thermometer 25 disposed downstream the second cooler 15 and upstream the T-die 17 and was controlled such that a temperature difference between T2 and T3 ranged from 10° C. to 30° C.

The amorphous PET-based polyester melt was pumped from the second cooler 15 into the T-die 17 for extrusion while variation of a sheet width of an extruded sheet from the T-die 17 was observed. The variation of the sheet width of the extruded sheet was evaluated by the moldability measurement described in Example 1 and is shown in Table 1. In addition, the film-forming capability of the extruded sheet from the T-die was evaluated according to the standards described in Example 1, and is shown in Table 1. The extruded sheet from the T-die 17 was transported through a casting machine 18 and a stretching machine 19 in sequence to obtain a polyester stretchable film.

Example 4

Figure 5:
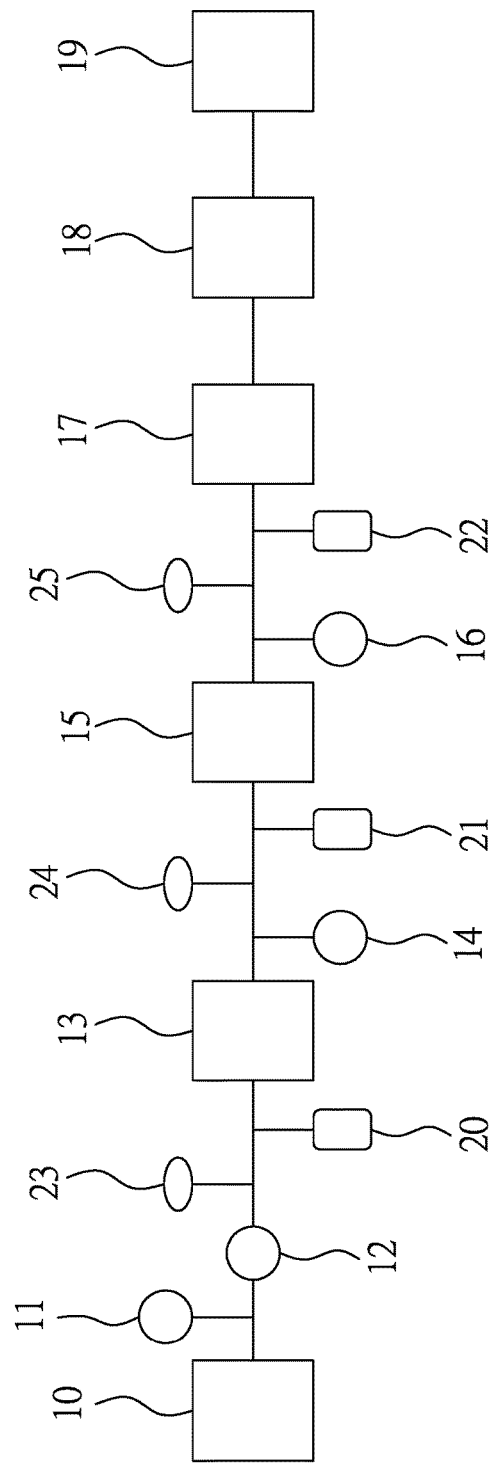
FIG. 5 is a schematic block diagram of a preparation system for Example 3 of a continuous process for preparing a polyester shrinkable film according to the disclosure.

Referring to FIG. 5, 100 mole % of terephthalic acid, 80 mole % of ethylene glycol, 20 mole % of neopentyl glycol, and 300 ppm of antimony trioxide catalyst were introduced into a polymerization reactor 10, in which an esterification reaction was conducted at a temperature of 267° C. under a pressure of 80-90 mPa for 4 hours, followed by a polymerization reaction at a temperature of 286° C. under a pressure of 2-3 mPa for 4 hours to obtain an amorphous PET-based polyester melt.

A melt viscosity $\eta 1$ of the amorphous PET-based polyester melt was measured using a first viscometer 11 disposed downstream the polymerization reactor 10 and upstream a first cooler 13. A pressure P1 of the amorphous PET-based polyester melt at the entry of the first cooler 13 was measured using a first pressure meter 20 disposed downstream the polymerization reactor 10 and upstream the first cooler 13. A temperature T1 of the amorphous PET-based polyester melt at the entry of the first cooler 13 was measured using a first thermometer 23 disposed downstream the polymerization reactor 10 and upstream the first cooler 13. The amorphous PET-based polyester melt having the melt viscosity $\eta 1$ was pumped directly from the polymerization reactor 10 into the first cooler 13 via a pump 12 in such a manner that a flow rate of the amorphous PET-based polyester melt at the entry of the first cooler 13 was substantially the same as the flow rate of the amorphous PET-based polyester melt at the exit of the first cooler 13.

The amorphous PET-based polyester melt was cooled in the first cooler 13 to increase the melt viscosity of the amorphous PET-based polyester melt to a melt viscosity $\eta 2$ while the melt viscosity $\eta 2$ was measured continuously using a second viscometer 14 disposed downstream the first cooler 13 and upstream a second cooler 15 such that a melt viscosity difference between $\eta 2$ and $\eta 1$ ranged from 1500 poise to 3500 poise. A temperature T2 of the amorphous PET-based polyester melt at the exit of the first cooler 12 was measured using a second thermometer 24 disposed downstream the first cooler 13 and upstream the second cooler 15 and was controlled such that a temperature difference between T1 and T2 ranges from 10° C. to 30° C.

A pressure P2 of amorphous PET-based polyester melt at the entry of the second cooler 15 was measured using a second pressure meter 21 disposed downstream the first cooler 13 and upstream the second cooler 15 and was controlled such that a pressure difference between P1 and P2 is not larger than 15 bar. The amorphous PET-based polyester melt was fed immediately from the first cooler 13 into the second cooler 15 in such a manner that the flow rate of the amorphous PET-based polyester melt at the entry of the second cooler 15 was substantially the same as the flow rate of the amorphous PET-based polyester melt at the exit of the second cooler 15.

The amorphous PET-based polyester melt was cooled in the second cooler 15 to increase the melt viscosity of the amorphous PET-based polyester melt to a melt viscosity $\eta 3$ while the melt viscosity $\eta 3$ was measured continuously using a third viscometer 16 disposed downstream the second cooler 15 and upstream a T-die 17 such that the melt viscosity $\eta 3$ was in a range from 5000 poise to 12000 poise and that a melt viscosity difference between $\eta 3$ and $\eta 2$ ranged from 1000 poise to 5500 poise. A temperature T3 of the amorphous PET-based polyester melt at the exit of the second cooler 15 was measured using a third thermometer 25 disposed downstream the second cooler 15 and upstream the T-die 17 and was controlled such that a temperature difference between T2 and T3 ranges from 10° C. to 30° C.

A pressure P3 of the amorphous PET-based polyester melt at the exit of the second cooler 15 was measured using a third pressure meter 22 disposed downstream the second cooler 15 and upstream the T-die 17 and was controlled such that a pressure difference between P2 and P3 is not larger than 15 bar. The amorphous PET-based polyester melt was pumped from the second cooler 15 into the T-die 17 for extrusion while variation of a sheet width of an extruded sheet from the T-die 17 was observed. The variation of the sheet width of the extruded sheet was evaluated by the moldability measurement described in Example 1 and is shown in Table 1. In addition, the film-forming capability of the extruded sheet from the T-die was evaluated according to the standards described in Example 1, and is shown in Table 1. The extruded sheet from the T-die 17 was transported through a casting machine 18 and a stretching machine 19 in sequence to obtain a polyester stretchable film.

Examples 5-7

The procedure of Example 4 was repeated using the conditions shown in Table 1, and variation of the sheet width of the extruded sheet was evaluated by the moldability measurement described in Example 1 and is shown in Table 1. In addition, the film-forming capability of the extruded sheet from the T-die was evaluated according to the standards described in Example 1, and is shown in Table 1.

Comparative Example 1

The procedure of Example 4 was repeated using the conditions shown in Table 2 in which the melt viscosity $\eta 3$ and the temperature difference between T3 and T2 were not controlled within the claimed ranges. Variation of the sheet width of the extruded sheet was evaluated by the moldability measurement described in Example 1 and is shown in Table 2. In addition, the film-forming capability of the extruded sheet from the T-die was evaluated according to the standards described in Example 1, and is shown in Table 2.

Comparative Example 2

The procedure of Example 4 was repeated using the conditions shown in Table 2 in which the melt viscosity difference between η2 and η1, the melt viscosity difference between η3 and η2, the pressure difference between P2 and P3, the temperature difference between T2 and T1, and the temperature difference between T3 and T2 were not controlled within the claimed ranges. Variation of the sheet width of the extruded sheet was evaluated by the moldability measurement described in Example 1 and is shown in Table 2. In addition, the film-forming capability of the extruded sheet from the T-die was evaluated according to the standards described in Example 1, and is shown in Table 2.

Comparative Example 3

Figure 6:
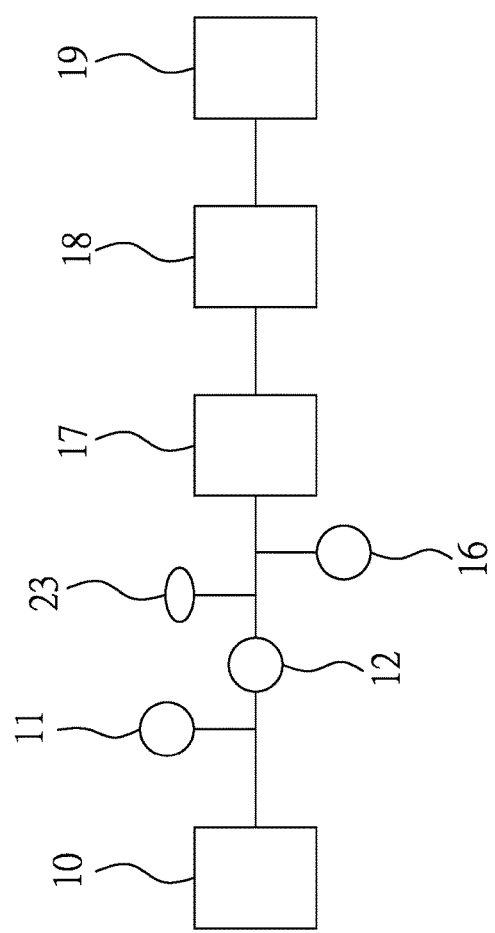
FIG. 6 is a schematic block diagram of a preparation system for Comparative Example 3 of a continuous process for preparing a polyester shrinkable film.

Referring to FIG. 6, 100 mole % of terephthalic acid, 80 mole % of ethylene glycol, 20 mole % of neopentyl glycol, and 300 ppm of antimony trioxide catalyst were introduced into a polymerization reactor 10, in which an esterification reaction was conducted at a temperature of 266° C. under a pressure of 80-90 mPa for 4 hours, followed by a polymerization reaction at a temperature of 287° C. under a pressure of 2-3 mPa for 4 hours to obtain an amorphous PET-based polyester melt.

A melt viscosity η1 of the amorphous PET-based polyester melt was measured using a first viscometer 11 disposed downstream the polymerization reactor 10 and upstream a pump 12. The melt viscosity η1 was measured as 2023 poise. A melt viscosity η3 of the amorphous PET-based polyester melt was measured using a third viscometer 16 disposed downstream the pump 12 and upstream a T-die 17. The melt viscosity η3 was measured as 2151 poise. A temperature T1 of the amorphous PET-based polyester melt at the entry of the T-die 17 was measured using a first thermometer 23 disposed downstream the polymerization reactor 10 and upstream the T-die 17.

The amorphous PET-based polyester melt was pumped directly from the polymerization reactor 10 into the T-die 17 for extrusion while variation of a sheet width of an extruded sheet from the T-die 17 was observed. The variation of the sheet width of the extruded sheet was evaluated by the moldability measurement described in Example 1 and is shown in Table 2. In addition, the film-forming capability of the extruded sheet from the T-die was evaluated according to the standards described in Example 1, and is shown in Table 2. The extruded sheet from the T-die 17 was transported through a casting machine 18 at a temperature ranging from 25° C. to 40° C. and a stretching machine 19 in sequence to obtain a polyester stretchable film.

Comparative Example 4

Figure 7:
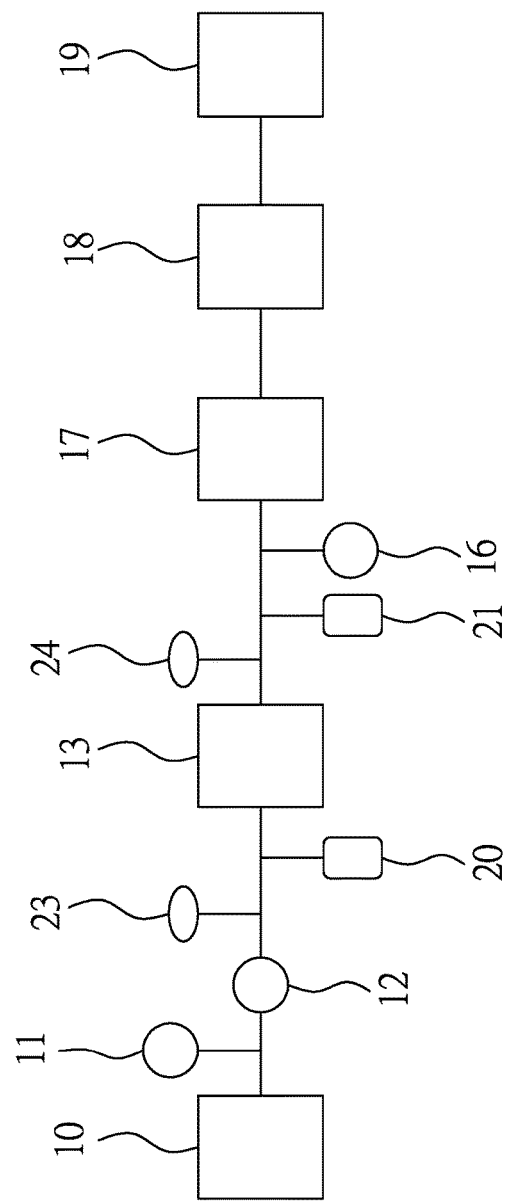
FIG. 7 is a schematic block diagram of a preparation system for Comparative Example 4 of a continuous process for preparing a polyester shrinkable film.

Referring to FIG. 7, 100 mole % of terephthalic acid, 80 mole % of ethylene glycol, 20 mole % of neopentyl glycol, and 300 ppm of antimony trioxide catalyst were introduced into a polymerization reactor 10 in which an esterification reaction was conducted at a temperature of 266° C. under a pressure of 80-90 mPa for 4 hours, followed by a polymerization reaction at a temperature of 287° C. under a pressure of 2-3 mPa for 4 hours to obtain an amorphous PET-based polyester melt.

A melt viscosity η1 of the amorphous PET-based polyester melt was measured using a first viscometer 11 disposed downstream the polymerization reactor 10 and upstream a first cooler 13. A pressure P1 of the amorphous PET-based polyester melt at the entry of the first cooler 13 was measured using a first pressure meter 20 disposed downstream the polymerization reactor 10 and upstream the first cooler 13. The amorphous PET-based polyester melt having the melt viscosity η1 was pumped directly from the polymerization reactor 10 into the first cooler 13 via a pump 12 in such a manner that a flow rate of the amorphous PET-based polyester melt at the entry of the first cooler 13 was substantially the same as the flow rate of the amorphous PET-based polyester melt at the exit of the first cooler 13. A temperature T1 of the amorphous PET-based polyester melt at the entry of the first cooler 13 was measured using a first thermometer 23 disposed downstream the polymerization reactor 10 and upstream the first cooler 13.

The amorphous PET-based polyester melt was cooled in the first cooler 13. A temperature T2 of the amorphous PET-based polyester melt at the exit of the first cooler 12 was measured using a second thermometer 24 disposed downstream the first cooler 13 and upstream a T-die 17.

A pressure P2 of the amorphous PET-based polyester melt at the exit of the first cooler 13 was measured using a second pressure meter 21 disposed downstream the first cooler 13 and upstream the T-die 17.

A melt viscosity η3 of the amorphous PET-based polyester melt at the exit of the first cooler 13 was measured using a third viscometer 16 disposed downstream the first cooler 13 and upstream the T-die 17.

The amorphous PET-based polyester melt was pumped from the first cooler 13 into the T-die 17 for extrusion while variation of a sheet width of an extruded sheet from the T-die 17 was observed. The variation of the sheet width of the extruded sheet was evaluated by the moldability measurement described in Example 1 and is shown in Table 2. In addition, the film-forming capability of the extruded sheet from the T-die was evaluated according to the standards described in Example 1, and is shown in Table 2. The extruded sheet from the T-die 17 was transported through a casting machine 18 at a temperature ranging from 25° C. to 40° C. and a stretching machine 19 in sequence to obtain a polyester stretchable film.

Comparative Example 5

The procedure of Example 4 was repeated using the conditions shown in Table 2 in which the melt viscosity difference between η2 and η1, the pressure difference between P1 and P2, and the temperature difference between T2 and T1 were not controlled within the claimed ranges. Variation of the sheet width of the extruded sheet was evaluated by the moldability measurement described in Example 1 and is shown in Table 2. In addition, the film-forming capability of the extruded sheet from the T-die was evaluated according to the standards described in Example 1, and is shown in Table 2.

TABLE 1

| | | \multicolumn{7}{c|}{Examples} |
| | | 1 | 2 | 3 | 4 | 5 | 6 | 7 |
|---|---|---|---|---|---|---|---|---|
| Melt viscosity (poise) | $\eta 1$ | 2133 | 2098 | 2181 | 2082 | 2167 | 2203 | 2091 |
| | $\eta 2$ | 5119 | 5063 | 5163 | 5006 | 3901 | 5598 | 4431 |
| | $\eta 3$ | 7498 | 7439 | 7561 | 7331 | 5079 | 10871 | 5543 |
| Melt viscosity difference (poise) | $\eta 2 - \eta 1$ | 2986 | 2965 | 2982 | 2924 | 1734 | 3395 | 2340 |
| | $\eta 3 - \eta 2$ | 2379 | 2376 | 2398 | 2325 | 1178 | 5273 | 1112 |
| Pressure (bar) | P1 | Not measured | 59 | Not measured | 59 | 49 | 68 | 53 |
| | P2 | | 51 | | 51 | 44 | 57 | 47 |
| | P3 | | 41 | | 42 | 38 | 45 | 40 |
| Pressure difference (bar) | P1 – P2 | — | 8 | — | 8 | 5 | 11 | 6 |
| | P2 – P3 | | 10 | | 9 | 6 | 12 | 7 |
| Temperature (° C.) | T1 | Not measured | Not measured | 286 | 286 | 285 | 285 | 286 |
| | T2 | | | 260 | 261 | 270 | 255 | 266 |
| | T3 | | | 245 | 245 | 260 | 230 | 256 |
| Temperature difference (° C.) | T1 – T2 | — | — | 26 | 25 | 15 | 30 | 20 |
| | T2 – T3 | | | 15 | 16 | 10 | 25 | 10 |
| Film-forming capability of extruded sheet from T-die | | ○ | ○ | ○ | ○ | ○ | ○ | ○ |
| Bending or damaging of heat-exchangingtubes in a first cooler or a second cooler | | No | No | No | No | No | No | No |
| Moldability | | ○ | ○ | ○ | ○ | ○ | ○ | ○ |

TABLE 2

| | | \multicolumn{5}{c|}{Comparative Examples} |
| | | 1 | 2 | 3 | 4 | 5 |
|---|---|---|---|---|---|---|
| Melt viscosity (poise) | $\eta 1$ | 2035 | 2045 | 2023 | 2033 | 2121 |
| | $\eta 2$ | 3852 | 6394 | — | — | 7325 |
| | $\eta 3$ | 3863 | Unmeasurable[a] | 2151 | 3716 | 10637 |
| Melt viscosity difference (poise) | $\eta 2 - \eta 1$ | 1817 | 4349 | — | — | 5204 |
| | $\eta 3 - \eta 2$ | 11 | uncalculated[a] | — | — | 3312 |
| Pressure (bar) | P1 | 46 | 83 | — | 44 | 72 |
| | P2 | 41 | 70 | — | 39 | 56 |
| | P3 | 39 | 51 | — | — | 46 |
| Pressure difference (bar) | P1 – P2 | 5 | 13 | — | 5 | 16 |
| | P2 – P3 | 2 | 19 | — | — | 10 |
| Temperature (° C.) | T1 | 287 | 287 | 287 | 287 | 245 |
| | T2 | 270 | 251 | — | 272 | 286 |
| | T3 | 270 | 211 | — | — | 230 |
| Temperature difference (° C.) | T1 – T2 | 17 | 36 | — | 15 | 41 |
| | T2 – T3 | 0 | 40 | — | — | 15 |
| Film-forming capability of extruded sheet from T-die | | X | X | X | X | ○ |
| Bending or damaging of heat-exchanging tubes in a first cooler or a second cooler | | No | Yes | — | No | Yes |
| Moldability | | X | Δ | X | X | Δ |

[a]melt viscosity was too high to be measured

As shown in Table 1, in Example 1, the amorphous PET-based polyester melt was cooled via two sequential cooling steps and the melt viscosity difference between $\eta 2$ and $\eta 1$, the melt viscosity $\eta 3$, and the melt viscosity difference between $\eta 3$ and $\eta 2$ were controlled within the claimed ranges prior to the film-forming treatment. The polyester stretchable film obtained thus has superior moldability.

In Example 2, the amorphous PET-based polyester melt was cooled via two sequential cooling steps and the melt viscosity difference between $\eta 2$ and $\eta 1$, the melt viscosity $\eta 3$, the melt viscosity difference between $\eta 3$ and $\eta 2$, the pressure difference between P1 and P2, and the pressure difference between P2 and P3 were controlled within the claimed ranges prior to the film-forming treatment. The polyester stretchable film obtained thus has superior moldability.

In Example 3, the amorphous PET-based polyester melt was cooled via two sequential cooling steps and the melt viscosity difference between $\eta 2$ and $\eta 1$, the melt viscosity $\eta 3$, the melt viscosity difference between $\eta 3$ and $\eta 2$, the temperature difference between T2 and T1, and the temperature difference between T3 and T2 were controlled within the claimed ranges prior to the film-forming treatment. The polyester stretchable film obtained thus has superior moldability.

In Examples 4-7, the amorphous PET-based polyester melt was cooled via two sequential cooling steps and the melt viscosity difference between $\eta 2$ and $\eta 1$, the melt viscosity $\eta 3$, the melt viscosity difference between $\eta 3$ and $\eta 2$, the pressure difference between P1 and P2, the pressure difference between P2 and P3, the temperature difference between T2 and T1, and the temperature difference between T3 and T2 were controlled within the claimed ranges prior to the film-forming treatment. The polyester stretchable film obtained thus has superior moldability.

In Comparative Example 1, although the amorphous PET-based polyester melt was cooled via two sequential cooling steps, the melt viscosity η3 and the temperature difference between T3 and T2 were not controlled within the claimed ranges prior to the film-forming treatment. The melt viscosity of the amorphous PET-based polyester melt was therefore too low to permit the amorphous PET-based polyester melt to be processed for forming the polyester stretchable film.

In Comparative Example 2, although the amorphous PET-based polyester melt was cooled via two sequential cooling steps, the melt viscosity η3, the pressure difference between P2 and P3, the temperature difference between T2 and T1, and the temperature difference between T3 and T2 were not controlled within the claimed ranges prior to the film-forming treatment. As a result, the melt viscosity of the amorphous PET-based polyester melt was too high and the polyester stretchable film obtained has inferior moldability. In addition, the pressure difference between P2 and P3 was larger than 15 bar, and the heat exchanging tubes in the second cooler were bent and damaged.

In Comparative Example 3, the amorphous PET-based polyester melt was not cooled prior to the film-forming treatment such that the melt viscosity η3 of the amorphous PET-based polyester melt was too low to permit the amorphous PET-based polyester melt to be processed for forming the polyester stretchable film.

In Comparative Example 4, the amorphous PET-based polyester melt was cooled merely via one cooling step and the melt viscosity difference between η2 and η1 and the melt viscosity η3 were not controlled within the claimed ranges prior to the film-forming treatment such that the melt viscosity η3 of the amorphous PET-based polyester melt was too low to permit the amorphous PET-based polyester melt to be processed for forming the polyester stretchable film.

In Comparative Example 5, although the amorphous PET-based polyester melt was cooled via two sequential cooling steps, the melt viscosity difference between η2 and η1, the pressure difference between P1 and P2, and the temperature difference between T2 and T1 were not controlled within the claimed ranges prior to the film-forming treatment. Thus the melt viscosity of the amorphous PET-based polyester melt was too high and the polyester stretchable film obtained has inferior moldability. In addition, the pressure difference between P1 and P2 was larger than 15 bar, and the heat exchanging tubes in the first cooler were bent and damaged.

In summary, in the continuous process for preparing a polyester shrinkable film according to the disclosure, the amorphous PET-based polyester melt is cooled via at least two sequential cooling steps and the melt viscosity difference between η2 and η1, the melt viscosity η3, the melt viscosity difference between η3 and η2, and optionally the pressure difference between P1 and P2, the pressure difference between P2 and P3, the temperature difference between T2 and T1, and the temperature difference between T3 and T2 are controlled within the claimed ranges prior to the film-forming treatment. Thus the polyester stretchable film obtained using the continuous process according to the disclosure has superior moldability.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A continuous process for preparing a polyester shrinkable film, comprising:
   (a) pumping an amorphous PET-based polyester melt having a melt viscosity η1 directly from a polymerization reactor into a first cooling zone in such a manner that a flow rate of the amorphous PET-based polyester melt at an entry of the first cooling zone is substantially the same as the flow rate of the amorphous PET-based polyester melt at an exit of the first cooling zone;
   (b) cooling the amorphous PET-based polyester melt in the first cooling zone to increase the melt viscosity of the amorphous PET-based polyester melt to a melt viscosity η2 such that a melt viscosity difference between η2 and η1 ranges from 1500 poise to 3500 poise;
   (c) feeding immediately after (b) the amorphous PET-based polyester melt from the first cooling zone into a second cooling zone in such a manner that the flow rate of the amorphous PET-based polyester melt at an entry of the second cooling zone is substantially the same as the flow rate of the amorphous PET-based polyester melt at an exit of the second cooling zone;
   (d) cooling the amorphous PET-based polyester melt in the second cooling zone to increase the melt viscosity of the amorphous PET-based polyester melt to a melt viscosity η3 ranging from 5000 poise to 12000 poise such that a melt viscosity difference between η3 and η2 ranges from 1000 poise to 5500 poise; and
   (e) pumping the amorphous PET-based polyester melt from the second cooling zone into a zone for film-forming treatment.

2. The continuous process for preparing a polyester shrinkable film according to claim 1, wherein the amorphous PET-based polyester melt has a pressure P1 at the entry of the first cooling zone, a pressure P2 at the entry of the second cooling zone, and a pressure P3 at the exit of the second cooling zone, wherein P1 is larger than P2, P2 is larger than P3, a pressure difference between P1 and P2 is not larger than 15 bar, and a pressure difference between P2 and P3 is not larger than 15 bar.

3. The continuous process for preparing a polyester shrinkable film according to claim 1, wherein in (a), the amorphous PET-based polyester melt has a temperature T1, and in (b), the amorphous PET-based polyester melt is cooled to a temperature T2 such that a temperature difference between T2 and T1 ranges from 10° C. to 30° C.

4. The continuous process for preparing a polyester shrinkable film according to claim 3, wherein in (d), the amorphous PET-based polyester melt is cooled to a temperature T3 such that a temperature difference between T3 and T2 ranges from 10° C. to 30° C.

5. The continuous process for preparing a polyester shrinkable film according to claim 1, wherein each of the first and second cooling zones includes at least one sub-cooling zone.

6. The continuous process for preparing a polyester shrinkable film according to claim 1, wherein the amorphous PET-based polyester melt is obtained by subjecting to polymerization a composition which includes a dicarboxylic acid component, a diol component, and a copolymerizable component that provides the amorphous PET-based polyester melt with an improved amorphous property and that is other than the dicarboxylic acid component and the diol component.

7. The continuous process for preparing a polyester shrinkable film according to claim 6, wherein the copolymerizable component is selected from the group consisting of isophthalic acid, neopentyl glycol, 1,4-cyclohexanedimethanol, 2-methyl-1,3-propylene glycol, diethylated 2-methyl-1,3-propylene glycol, and combinations thereof.

8. The continuous process for preparing a polyester shrinkable film according to claim 7, wherein the copolymerizable component is isophthalic acid, which is in an amount ranging from 10 to 35 moles based on 100 moles of the dicarboxylic acid component.

9. The continuous process for preparing a polyester shrinkable film according to claim 7, wherein the copolymerizable component is selected from the group consisting of neopentyl glycol, 1,4-cyclohexanedimethanol, 2-methyl-1,3-propylene glycol, diethylated 2-methyl-1,3-propylene glycol, and combinations thereof, and the copolymerizable component is in an amount ranging from 10 to 25 moles based on 100 moles of the diol component.

10. The continuous process for preparing a polyester shrinkable film according to claim 1, wherein the amorphous PET-based polyester melt has an intrinsic viscosity larger than 0.58.

11. The continuous process for preparing a polyester shrinkable film according to claim 1, wherein the film-forming treatment includes casting and biaxial stretching.

* * * * *